(12) United States Patent
Lui et al.

(10) Patent No.: US 7,607,318 B2
(45) Date of Patent: Oct. 27, 2009

(54) INTEGRATED ENVIRONMENTAL CONTROL AND AUXILIARY POWER SYSTEM FOR AN AIRCRAFT

(75) Inventors: Clarence W. T. Lui, Diamond Bar, CA (US); Jean-Luc Derouineau, Phoenix, AZ (US); Henry M. Claeys, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 692 days.

(21) Appl. No.: 11/440,486

(22) Filed: May 25, 2006

(65) Prior Publication Data

US 2007/0271952 A1 Nov. 29, 2007

(51) Int. Cl.
F25D 9/00 (2006.01)
(52) U.S. Cl. ............... 62/402; 60/39.83; 244/118.5
(58) Field of Classification Search ............ 62/401, 62/402, 86, 87, 172, 335; 60/39.15, 39.183, 60/39.83; 244/118.5, 58, 117, 129
See application file for complete search history.

(56) References Cited

U.S. PATENT DOCUMENTS

| | | | |
|---|---|---|---|
| 2,777,301 A | 1/1957 | Kuhn | |
| 3,965,673 A | 6/1976 | Friedrich | |
| 4,419,926 A | 12/1983 | Cronin et al. | |
| 4,494,372 A | 1/1985 | Cronin | |
| 4,503,666 A | 3/1985 | Christoff | |
| 4,514,976 A | 5/1985 | Christoff | |
| 4,684,081 A | 8/1987 | Cronin | |
| 4,864,812 A | 9/1989 | Rodgers et al. | |
| 5,299,763 A | 4/1994 | Bescoby et al. | |
| 5,343,692 A | 9/1994 | Thomson et al. | |
| 5,442,905 A | 8/1995 | Claeys et al. | |
| 5,461,882 A | 10/1995 | Zywiak | |
| 5,490,645 A | 2/1996 | Woodhouse | |
| 5,743,081 A * | 4/1998 | Reynolds | ............. 60/39.17 |
| 5,813,630 A | 9/1998 | Williams | |
| 5,899,085 A | 5/1999 | Williams | |
| 5,921,093 A | 7/1999 | Jonqueres | |
| 5,939,800 A | 8/1999 | Artinian et al. | |
| 5,956,960 A | 9/1999 | Niggeman | |
| 6,124,646 A | 9/2000 | Artinian et al. | |
| 6,128,909 A | 10/2000 | Jonqueres | |
| 6,283,410 B1 | 9/2001 | Thompson | |
| 6,306,032 B1 * | 10/2001 | Scheffler et al. | ............. 454/71 |
| 6,316,841 B1 | 11/2001 | Weber | |

(Continued)

*Primary Examiner*—Mohammad M Ali
(74) *Attorney, Agent, or Firm*—Ingrassia Fisher & Lorenz, P.C.

(57) ABSTRACT

An integrated environmental control system for an aircraft compartment and aircraft power system comprises first and second air compressors, an auxiliary power unit, and first and second environmental control systems. The first and second compressors receive and compress airflow from the aircraft exterior. The auxiliary power unit comprises a first shaft rotatably mounting a power turbine, a third air compressor to compress airflow from the aircraft exterior, and a first cooling turbine to cool the airflow. Each environmental control system comprises a first heat exchanger, a recycling heat exchanger, and a second shaft rotatably mounting a fourth compressor and a second cooling turbine for compressing and cooling the airflow. The first heat exchanger receives airflow from the first, second, and third air compressors and forwards airflow to the aircraft compartment. The recycling heat exchanger receives airflow from the aircraft compartment and recirculates airflow back to the aircraft compartment.

20 Claims, 3 Drawing Sheets

U.S. PATENT DOCUMENTS

| | | | |
|---|---|---|---|
| 6,427,471 B1 | 8/2002 | Ando et al. | |
| 6,457,318 B1 * | 10/2002 | Lui et al. | 62/87 |
| 6,526,775 B1 | 3/2003 | Asfia et al. | |
| 6,615,606 B2 * | 9/2003 | Zywiak | 62/402 |
| 6,681,592 B1 | 1/2004 | Lents et al. | |
| 6,704,625 B2 * | 3/2004 | Albero et al. | 701/3 |
| 6,776,002 B1 | 8/2004 | Ho | |
| 6,796,131 B2 | 9/2004 | Sampson | |
| 6,845,630 B2 * | 1/2005 | Bruno et al. | 62/323.3 |
| 6,928,832 B2 * | 8/2005 | Lents et al. | 62/401 |
| 6,981,388 B2 * | 1/2006 | Brutscher et al. | 62/401 |

* cited by examiner

INTEGRATED ENVIRONMENTAL CONTROL AND AUXILIARY POWER SYSTEM FOR AN AIRCRAFT

TECHNICAL FIELD

The present invention relates to power and environmental control systems for various aircrafts. More particularly, the present invention relates to auxiliary power systems and electrically-driven air cycle systems that regulate the temperature of at least the aircraft fuselage.

BACKGROUND

Passenger aircrafts are typically equipped with an environmental control system, including an air cycle conditioning system for cooling the aircrew cabins, and other aircraft locations and components. One class of air cycle conditioning systems that are widely used in aircraft to provide cooled air takes advantage of a supply of pressurized air that is bled from an aircraft engine, known as bleed air. Other electrically-driven environmental control systems generally operate by receiving fresh ram air from inlets that are located in at least one favorable position near the ECS equipment bay. The fresh ram air is supplied to at least one electric motor-driven air compressor that raises the air pressure to, for example, the desired air pressure for the cabins. From the at least one air compressor, the air is supplied to an optional ozone converter. Because air compression creates heat, the air is then supplied to an air conditioning pack in which the air is cooled and then transported to the cabin. At least one recirculation system is also provided to recycle air from the cabin and mix it the cooled fresh air.

A conventional auxiliary power unit is a system that provides both air and electricity to the aircraft, duplicates some of the electrically-driven environmental control system in terms of the incorporated components, their functions, and their relative configuration. The auxiliary power unit and the environmental control system are two independent systems, despite the fact that identical components, such as compressors and turbines, are used by both. FIG. 1 is a flow chart depicting an air cycle pathways 25 in an aircraft, including a conventional environmental control system (ECS) 20 a conventional auxiliary power unit (APU) 45, and a redundant ECS 18. As understood from viewing FIG. 1, both ECSs 18 and 20 have substantially identical air cycle pathways.

The ECS 20 will be first described in detail. Details pertaining to the redundant ECS 18 will not be described to the extent that its components are identical to those of the ECS 20. Further, components from the ECS 18 that are substantially identical in their function to those of the ECS 20 are identified with the same reference numerals as those of the ECS 20, with an added prime symbol (i.e. ECS primary heat exchanger 32 and redundant ECS primary heat exchanger 32′).

Air is received by the ECS 20 from both the aircraft exterior as fresh ram air, and from the aircraft fuselage or other interior space as recirculation air. Fresh ram air is supplied from cabin compressors 10a, 10b powered by motors 11a, 11b. The compressed ram air passes through a primary heat exchanger 32 that is disposed in a ram air heat exchanger circuit 56. The ram air heat exchanger circuit 56 has ambient ram air passing therethrough, which cools compressed air in the primary heat exchanger 32, a secondary heat exchanger 34, and an air recirculation heat exchanger 36 that are located in the circuit 56. The ambient ram air is drawn into the heat exchanger circuit 56 through a ram scoop during aircraft flight. When the aircraft is stationary, the ram air heat circuit 56 is driven by an electric fan 54 disposed downstream of the heat exchangers 32, 34, 36 so the heat from the fan 54 is directed overboard rather than into the heat exchangers 32, 34, 36. The ambient ram air in the circuit 56 is cooler than the air passing through the heat exchangers 32, 34, 36, and therefore serves as a heat sink.

After the compressed ram air passes through the primary heat exchanger 32, the air is supplied to a bootstrap air cycle machine, referring specifically to a compressor 40 and turbine 42 that either share the same rotating axis or are otherwise powered and rotated together. The compressor 40 further pressurizes and heats the ram air. The compressed air is then supplied to the secondary heat exchanger 34, causing the compressed air to cool. During normal operation, an altitude valve 60 is closed, causing the air to pass through a re-heater 44 and a condenser 46, and then through a water exchanger 48, which substantially dries the air. From the water exchanger 48, the air is again heated in the re-heater 44, and then the hot and dry air is supplied to the turbine 42. The turbine 42 provides cooled air as a product of air expansion, and forwards the cooled air to the condenser 46, which cools the air further and supplies the air to the cabins in the aircraft fuselage 30. At high altitudes, the altitude valve 60 is opened. The relatively dry and cool air from the high altitude consequently flows from the primary and secondary heat exchangers 34, 32, bypassing the bootstrap air cycle machine, and flows to the cabin. This bypass mode of operation minimizes the supply pressure to the ECS 20 and reduces the required input power to the cabin air compressors 10a-10d.

A majority of the recirculation air is transferred back to the ECS 20 using a recirculation fan 52, which supplies the recirculation air to the recirculation heat exchanger 36 for cooling. The cooled recirculation air leaves the recirculation heat exchanger 36 and is then mixed with the fresh air being supplied to the aircraft fuselage 30. When limited cooling is required, a recirculation heat exchanger bypass valve 64 is opened, allowing the recirculation air from the recirculation fan 52 to bypass the recirculation heat exchanger 36. Thus, the ECS 20 delivers a dry, subfreezing supply of air to the air distribution system 26 with a significant portion of the ventilation air entering the aircrew cabins being recirculation air.

The combination of the ECS and APU, with their various duplicative components, is expensive and heavy. The architecture as a whole includes a total of eleven turbo machines including the APU power section, two air cycle machines, two ground cooling fans, two recirculation fans, and four cabin pressure compressors. The overall architecture also includes ten heat exchangers, including primary and secondary cooling and reheating and condensing systems for moisture removal and two recirculation coolers. Further, the APU is only used when an aircraft is on ground, and is shut off during a normal flight operation to become a dead weight to the aircraft.

Hence, there is a need to leverage the ECS and APU components in order to reduce the overall weight, volume and energy used during aircraft operation. There is a further need for such systems to include fewer components in order to reduce manufacturing cost.

BRIEF SUMMARY

The present invention provides an integrated environmental control system for an aircraft compartment and aircraft power system. According to a first embodiment, the system comprises first and second air compressors, each air compressor adapted to receive and compress airflow from the aircraft exterior; an auxiliary power unit comprising a first shaft rotatably mounting a power turbine, a third air compressor adapted to receive and compress airflow from the aircraft exterior, and a first cooling turbine adapted to cool the airflow; and first and second environmental control systems. Each environmental control system comprises a first heat exchanger, a recycling heat exchanger, and a second shaft rotatably mounting a fourth compressor and a second cooling turbine for compressing and cooling the airflow. The first heat exchanger is adapted to receive the airflow from the first, second, and third air compressors and to forward airflow to the aircraft compartment. The recycling heat exchanger is adapted to receive airflow from the aircraft compartment and to recirculate the airflow back to the aircraft compartment.

According to a second embodiment, the system comprises first and second air compressors, each air compressor adapted to receive and compress airflow from the aircraft exterior, an auxiliary power unit, and first and second environmental control systems. The auxiliary power unit comprises a first shaft, a power turbine rotatably mounted on the first shaft, a third air compressor rotatably mounted on the first shaft and adapted to receive and compress airflow from the aircraft exterior, and a first cooling turbine rotatably mounted on the first shaft and adapted to cool the airflow. Each of the environmental control systems comprises a second shaft, a fourth compressor rotatably mounted on the second shaft for compressing the airflow, a second cooling turbine rotatably mounted on the second shaft for cooling the airflow, a heat exchanger circuit, and a separate heat exchanger not included in the circuit. The heat exchanger circuit comprises a first heat exchanger adapted to receive the airflow from the first, second, and third air compressors, a second heat exchanger adapted to receive the airflow from the fourth compressor and to forward the airflow to the second cooling turbine, and a recirculation heat exchanger adapted to receive the airflow from the aircraft compartment. The separate heat exchanger is adapted to receive the airflow from the first heat exchanger and to forward the airflow to the fourth compressor, and is further adapted to receive and cool the airflow from the second cooling turbine using the airflow from the first heat exchanger.

According to a third embodiment, the system comprises first and second air compressors, each air compressor adapted to receive and compress airflow from the aircraft exterior, an auxiliary power unit, and first and second environmental control systems. The auxiliary power unit comprises a first shaft, a power turbine rotatably mounted on the first shaft, a third air compressor rotatably mounted on the first shaft and adapted to receive and compress airflow from the aircraft exterior, and a first cooling turbine rotatably mounted on the first shaft and adapted to cool and forward the airflow to the aircraft compartment. Each environmental control system comprises a first heat exchanger adapted to receive the airflow from the first, second, and third air compressors, a second shaft, a second cooling turbine rotatably mounted on the second shaft and adapted to receive and cool the airflow from the first heat exchanger, and further adapted to forward the airflow to the aircraft compartment, a compressor rotatably mounted on the second shaft and adapted to receive and compress the airflow from the aircraft compartment, and a second heat exchanger adapted to receive the airflow from the fourth compressor, and further adapted to forward the airflow to the first cooling turbine.

Other independent features and advantages of the preferred environmental control system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention includes architectural designs that integrate the APU and ECS for an aircraft in order to regulate the temperature and pressure of an aircraft fuselage compartment while providing power for aircraft engine starting, utilities, and emergency backup. Integrating the otherwise redundant systems reduces the number of built-in components to effectively lower the aircraft weight and cost.

Figure 1:
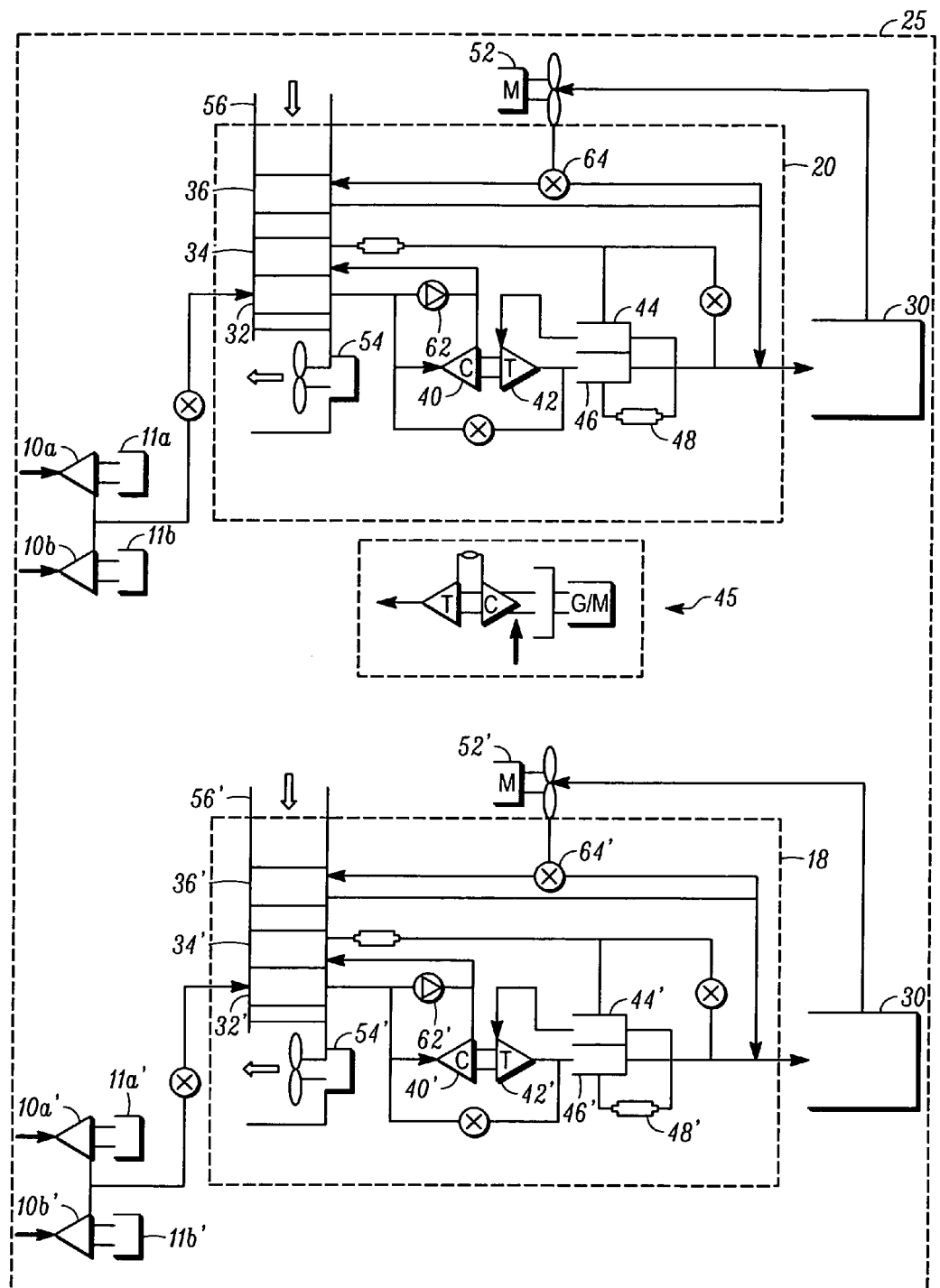
FIG. 1 is a flow chart depicting air cycle pathways for a conventional ECS and a conventional APU in an aircraft.
Figure 2:
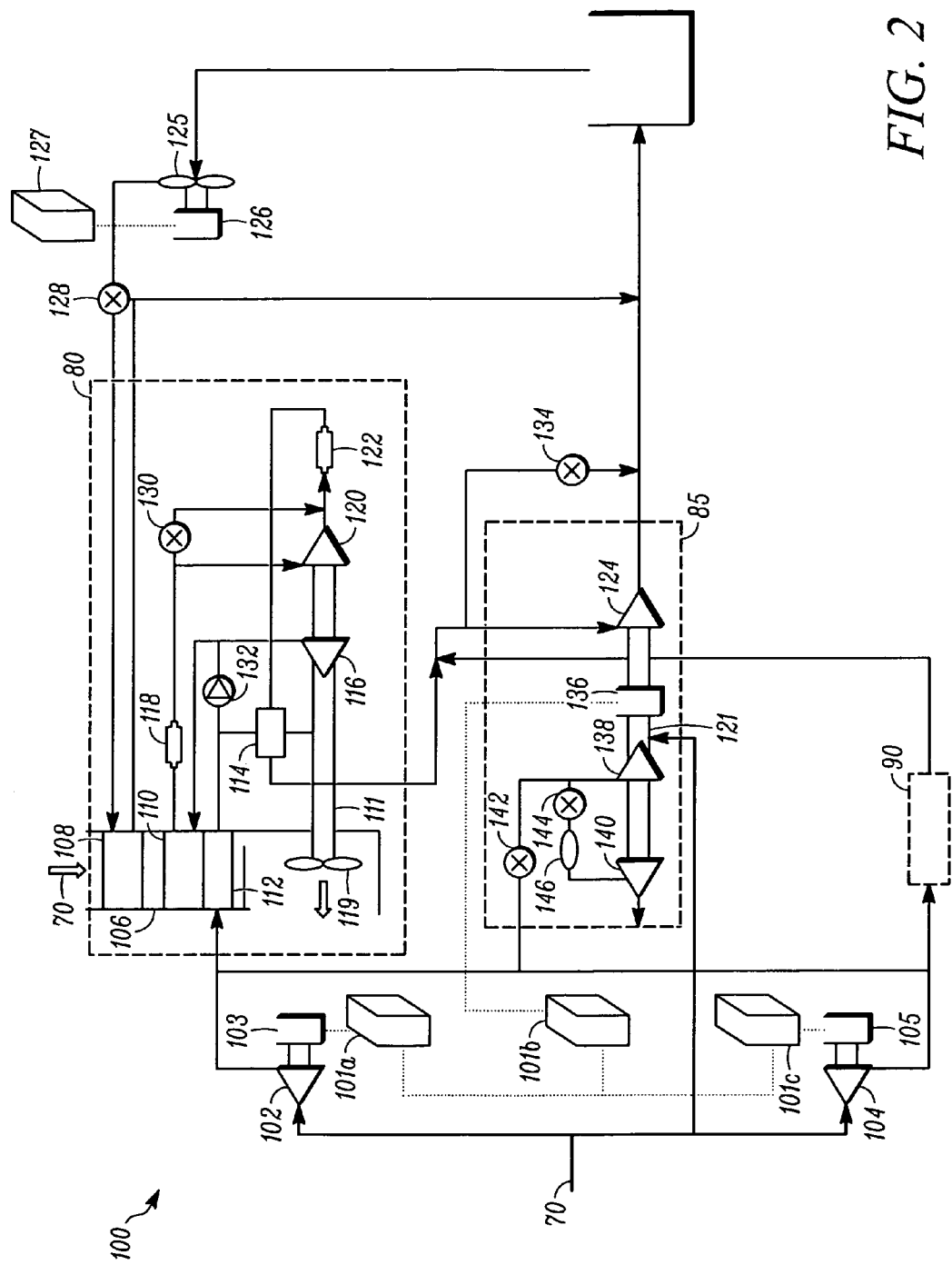
FIG. 2 is a flow chart depicting a first exemplary integrated environmental and power system including an APU integrated with an ECS.

Turning now to FIG. 2, a flow chart illustrates the top-level architecture of an exemplary integrated environmental control and power system 100, which includes an auxiliary power and cooling unit (APCU) 85 integrated with a first and second ECS 80 and 90 for regulating pressure and temperature for the cabin or other compartment in an aircraft fuselage 150. The overall system 100 includes only seven turbo machines instead of the eleven turbo machines utilized in the conventional system depicted in FIG. 1. The number of air cabin pressurization compressors is also reduced from four to three, with a compressor on the APCU satisfying the minimum redundancy requirement of at least three compressors. Further, the system 100 reduces the number of heat exchangers from ten to eight. These and other components will be described in detail below.

The APCU 85, the first ECS 80, and the second ECS 90 are the primary components of the system 100. The second ECS 90 has an identical architecture to that of the first ECS 80 although the components of the second ECS 90 are not depicted in FIG. 2. Descriptions and references pertaining to the first ECS 80 will also pertain to the second ECS 90.

The major elements of the APCU 85 are the compressor 138, the generator/motor 136, a power turbine 140, a cooling turbine 124, and a combustor 146. A shaft 121 rotatably mounts the compressor 138, the generator/motor 136, and the cooling turbine 124 such that the mounted components are powered and rotate together. The ECS 80 includes as major elements a ram air heat exchanger circuit 106 and a bootstrap air cycle machine, referring specifically to a compressor 116, a turbine 120, and a fan 119 that are mounted on a shared rotating shaft 111 and are consequently powered and rotated together. The ram air heat exchanger circuit 106 has ambient ram air 70 passing therethrough, which cools compressed air in a primary heat exchanger 112, a secondary heat exchanger 110, and an air recycling heat exchanger 108 that are located in the circuit 106. The ambient ram air is drawn into the heat exchanger circuit 106 through a ram scoop during aircraft flight. When the aircraft is stationary, the ram air heat circuit 106 is driven by the air cycle machine fan 119, which is disposed downstream of the heat exchanger 108, 110, and 112 so that heat generated from the fan 119 is directed overboard rather than into the circuit 106. The ambient ram air in the circuit 106 is cooler than the air passing through the heat exchangers 108, 110, and 112 and therefore serves as a heat sink.

Depending on whether the aircraft is on ground or in flight, air is directly supplied to the ECS 80 as ram air from two electric compressors 102 and 104 or from a compressor 138 that is included in the APCU 85. During flight, ram air 70 is channeled to the cabin air compressors 102 and 104, and also to the APCU compressor 138. A valve 142 is opened and the APCU compressor 138 supplies additional pressurized air through the valve 142 to the ECS 80. The cabin air compressors 102 and 104 are powered by motors 103 and 105, respectively, and each motor is activated and regulated by a controller 101a and 101c, respectively. Likewise, a generator/motor 136 powers the APCU compressor 180, and is activated and regulated by a controller 101b that adjusts the APCU input and output power.

The design of the integrated system 100 also enables the use of the APCU 85 to power various system components, particularly during on ground operations. As previously discussed, the APCU compressor 138 can supply pressurized air to the ECS 80 during flight. During on ground operations another bypass valve 144 is opened so air flow from the APCU compressor 138 is directed to a combustor 146 associated with the power turbine 140 for providing electric power to the aircraft. Thus, the APCU compressor 138 is functioning during in-flight and on-ground operations, making use of the APCU 85 at all times. As previously discussed, this is in contrast to the conventional APCU that is essentially dead weight during flight.

Pressurized air, supplied to the ECS 80 as ram air by the electric compressors 102 and 104 and/or by the APCU compressor 138, is cooled and dried. The primary heat exchanger 112 cools the air and forwards it to another heat exchanger 114 that is not part of the ram air heat circuit 106. The heat exchanger 114 further cools the air, which continues to the air cycle machine compressor 116. A check valve 132 may be configured to allow some or all of the air to bypass the heat exchanger 114 and the compressor 116. Also, both the heat exchanger 114 and the compressor 116 may be bypassed during a cruise condition when no active expansion cooling is required. The compressor pressurizes the air, and consequently heats the air as well. Thus, the air is cooled through the secondary heat exchanger 110 and then dried using a water separator 118. The air is then expanded and further cooled using the air cycle machine turbine 120. A temperature control bypass valve 130 allows the air to bypass the turbine 120 for temperature control. This cooled air flows directly through another water separator 122 for further drying. Finally, the air passes through the heat exchanger 114 (cooling side). The compressor 116 inlet air temperature is reduced by the air passing from the turbine 120 through the heat exchanger 114, thereby improving the overall efficiency of the compressor 116. The heat exchanger 114 thus acts as a sub-cooler of the compressor inlet air, and also as a re-heater of the cooling turbine discharge flow since the thermal energy of the compressor inlet air transfers to the turbine discharge air and raises the air temperature while evaporating the free water in the air.

After the turbine discharge air is warmed using the heat exchanger 114, it is transferred to the APCU cooling turbine 124 and then to the cabin or other fuselage compartment 150. A bypass valve 134 may be configured to allow the air to bypass the turbine 124 and go directly to the fuselage compartment 150 if it is already sufficiently cool.

Cooled and pressurized air flows through the fuselage compartment 150. The air is then passed through a recycling circuit and then mixed with newly cooled and pressurized air before being reintroduced into the fuselage compartment 150. A recycling fan 125 is driven by a motor 126, which in turn is activated and regulated by a controller 127. Air is driven by the fan into the recycling heat exchanger 108 for further cooling before being mixed with the newly cooled and pressurized air. A bypass valve 128 may be configured to allow the recycled air to bypass the recycling heat exchanger 108 if the air is sufficiently cool.

Figure 3:
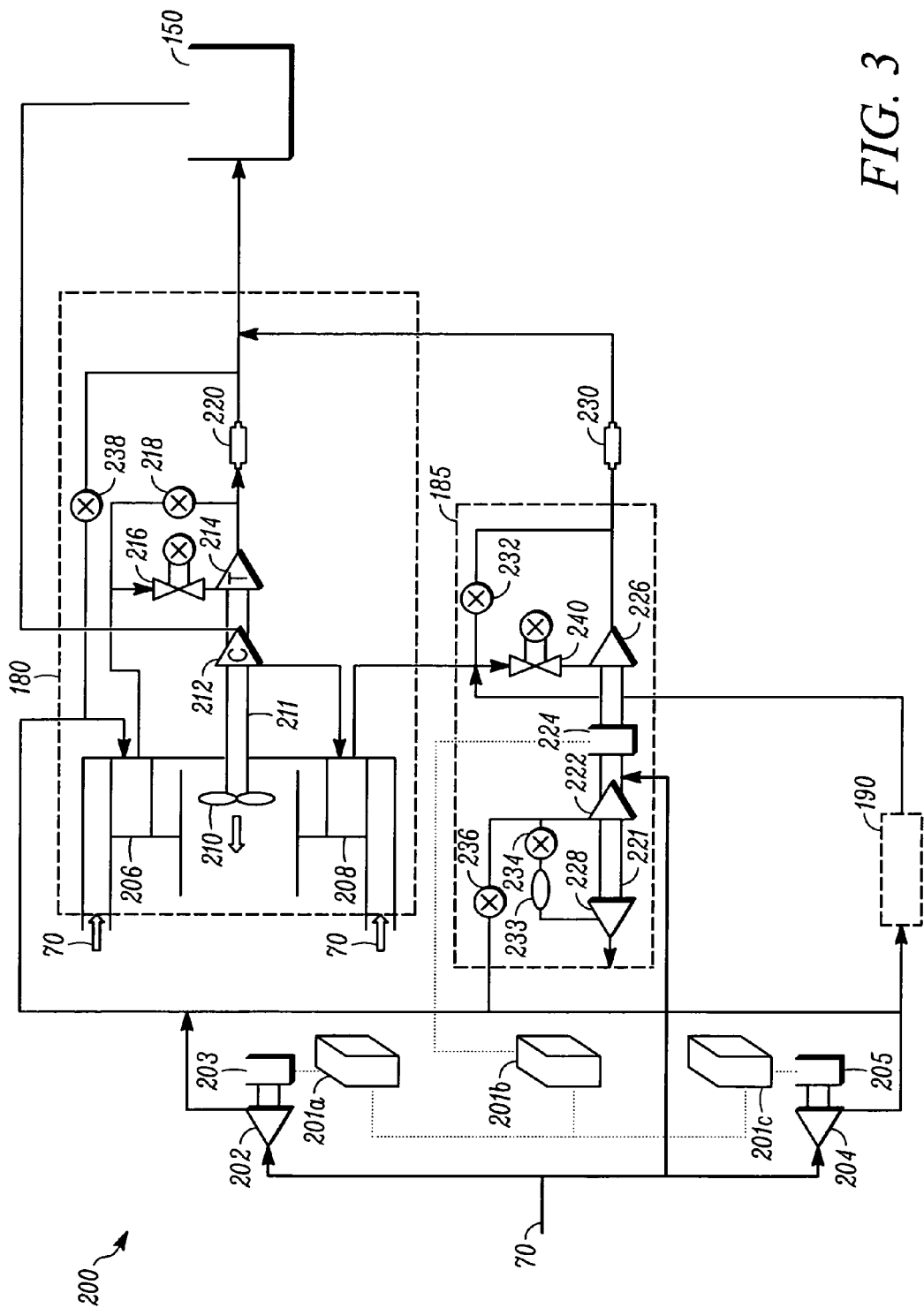
FIG. 3 is a flow chart depicting a second exemplary integrated environmental and power system including an APU integrated with an ECS.

Turning now to FIG. 3, a flow chart illustrates the top-level architecture of another exemplary integrated environmental control and power system 200, which includes an APCU 185 integrated with a first and second ECS 180 and 190 for regulating pressure and temperature for an aircrew cabin or other fuselage compartment 150. The overall system 200 includes only five turbo machines, and the number of air cabin pressurization compressors is again reduced from four to three, and possibly two, with a compressor on the APCU satisfying the minimum redundancy requirement. Further, the system 200 reduces the number of heat exchangers to four. These and other components will be described in detail below.

The APCU 185, the first ECS 180, and the second ECS 190 are the primary components of the system 200. Like the previously described embodiment, the second ECS 190 has an identical architecture to that of the first ECS 180 although the components of the second ECS 190 are not depicted in FIG. 3. Descriptions and references pertaining to the first ECS 180 will also pertain to the second ECS 190.

The APCU 185 is nearly identical to the APCU from the previously described embodiment, and includes as major elements a compressor 238, a generator/motor 236, a power turbine 240, a cooling turbine 224, and a combustor 246. The APCU also includes a variable geometry nozzle 240 associated with the cooling turbine 224. The ECS 80 includes a bootstrap air cycle machine, referring specifically to a compressor 212, a turbine 214, and a fan 210 that either share the same rotating axis or are otherwise powered and rotated together. The ECS also includes a variable geometry nozzle associated with the turbine 214. Instead of a ram air heat exchanger circuit the ECS includes two separate heat exchangers 206 and 208, each of which has ambient ram air 70 passing therethrough, which cools compressed air. The ambient ram air 70 is drawn into the heat exchangers 206 and 208 through a ram scoop during aircraft flight. When the aircraft is stationary, ambient air is driven by the air cycle machine fan 210 to cool both of the heat exchangers 206 and 208. The fan 210 is disposed downstream of the heat exchangers 206 and 208 in order for heat generated from the fan 210 to be directed overboard rather than heating the heat exchangers 206 and 208. The ambient ram air 70 in the circuit 106 is cooler than the compressed air passing through the heat exchangers 206 and 208 and therefore serves as a heat sink.

Like the previously described embodiment, air is directly supplied to the ECS 180 as ram air and/or from a compressor 222 that is included in the APCU 185, depending on whether the aircraft is in flight or on ground. During flight, ram air 70 is channeled to the cabin air compressors 202 and 204, and also to the APCU compressor 222. A valve 236 is opened and the APCU compressor 222 supplies additional pressurized air through the valve 236 to the ECS 180. The cabin air compressors 202 and 204 are powered by motors 203 and 205, respectively, and each motor is activated and regulated by a controller 201a and 201c, respectively. Likewise, a generator/motor 224 powers the APCU compressor 222, and is activated and regulated by a controller 201b that adjusts the APCU input and output power. During on-ground operations, another bypass valve 234 associated with a combustor 233 and the power turbine 228 is opened so the APCU will generate electricity to power the aircraft components. Thus, the APCU 185 is functioning during in-flight and on-ground operations.

The ECS 180 cools, compresses, and dries air received from the compressors 202, 204 and/or 138. The first heat exchanger 206 cools the air, and then the air is expanded and further cooled using the cooling turbine 214. The air enters the cooling turbine 214 through the variable geometry nozzle 216, which enables turbine operation at different flows and pressures according to an operation mode. For example, the APCU 185 may provide hot air at a high pressure, while the electric compressors 102 and 104 may provide higher flow at lower pressure and temperature. The cooling turbine 214 cools the air to a non-subfreezing temperature, meaning that the air is cooled to a temperature that is no lower than the freezing temperature for water. By cooling to non-subfreezing temperatures, the energy demanded from the overall APCU 185 is extremely low when compared with cooling turbine energy requirements from conventional systems such as that described in relation to FIG. 1. The low energy demand, coupled with the small overall size requirement for the APCU 185 requires little fuel consumption. The use of the cooling turbine 214 reduces the number of components and overall weight of the system 200 when compared with conventional systems such as that described in relation to FIG. 1.

From the cooling turbine 214, the air is dried using a water separator 220 and transferred to the fuselage compartment 150. A check valve 218 is configurable to allow some or all of the air to bypass the cooling turbine 214 and flow directly through the water separator 220 and into the fuselage compartment 150. Another check valve 238 is configurable to redirect the air from the heat exchanger 206 directly to the fuselage compartment 150 if the first heat exchanger cooling is sufficient. The ECS compressor 212 receives recirculation air from the fuselage compartment 150 and pressurizes the air. Power generated from expanding the air using the cooling turbine 120 drives the ECS compressor 212 since the two components are on the same shaft. The compressor 212 drives the recirculation airflow from the compartment 150, removing the need for a recirculation fan. Since compression heats the air, the second heat exchanger 208 is downstream from the compressor 212. Air flowing through the second heat exchanger 208 is further cooled and then directed out of the ECS 180.

From the ECS 180, re-circulating air is transferred to the APCU 185 before flowing back into the fuselage compartment 150. The APCU cooling turbine 226 receives the air through a variable geometry nozzle 240 and, like the ECS cooling turbine 214, cools the air to a non-subfreezing temperature. Again, by cooling to non-subfreezing temperatures, the required energy is extremely low, which in turn requires little fuel consumption. A bypass valve 232 is configurable to allow the air to bypass the cooling turbine 226 and flow toward the compartment 150 if the air is sufficiently cooled upon entering the APCU 185. Regardless of whether the air is cooled and expanded using the cooling turbine 226, the air is dried using a water separator 230 before re-circulating into the compartment 150.

Thus, the previously-described integrated APCU and ECS provide a low energy consumption cycle that minimizes the expenditure of power and reduces the weight of the overall system by coupling the power turbo machine and the ECS air cycle system to reduce component redundancy. The integrated architecture, including two cabin compressors and an APCU compressor, reduces the ECS power requirements, particularly during on ground operations. The full time operation of the APCU compressor minimizes the number of needed cabin air compressors. Further, the ECS compressor inlet sub-cooling performed by the cooling turbine improves overall compression efficiency. Finally, the use of the APCU cooling turbine expands energy laden air while expanding recirculation flow.

While these and other features of the invention have been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An integrated environmental control system for an aircraft compartment and aircraft power system, comprising:
    first and second air compressors, each air compressor adapted to receive and compress airflow from the aircraft exterior;
    an auxiliary power unit comprising:
        a first shaft,
        a power turbine rotatably mounted on the first shaft,
        a third air compressor rotatably mounted on the first shaft and adapted to receive and compress airflow from the aircraft exterior, and
        a first cooling turbine rotatably mounted on the first shaft and adapted to cool the airflow; and
    first and second environmental control systems, each environmental control system comprising:
        a first heat exchanger adapted to receive the airflow from the first, second, and third air compressors and to forward airflow to the aircraft compartment,
        a recycling heat exchanger adapted to receive airflow from the aircraft compartment and to recirculate the airflow back to the aircraft compartment,
        a second shaft,
        a fourth compressor rotatably mounted on the second shaft for compressing the airflow, and
        a second cooling turbine rotatably mounted on the second shaft for expanding and cooling the airflow.

2. The integrated environmental control system for an aircraft compartment and aircraft power system according to claim 1, wherein the auxiliary power unit further comprises an electrical generator and motor mounted on, and adapted to power rotation of, the first shaft.

3. The integrated environmental control system for an aircraft compartment and aircraft power system according to claim 1, wherein the auxiliary power unit is configured to provide airflow to the first heat exchanger using the third compressor.

4. The integrated environmental control system for an aircraft compartment and aircraft power system according to claim 3, wherein the auxiliary power unit is configured to provide airflow to the first heat exchanger using the third compressor at least while the aircraft is in flight, and to power the first and second air compressors using the power turbine at least while the aircraft is on ground.

5. The integrated environmental control system for an aircraft compartment and aircraft power system according to claim 1, wherein each environmental control system further comprises a fan rotatably mounted on the second shaft and adapted to drive ambient air for cooling the first and second heat exchangers.

6. The integrated environmental control system for an aircraft compartment and aircraft power system according to claim 1, wherein each environmental control system is configured to utilize power extracted from cooling the airflow using the cooling turbine to rotate the second shaft.

7. An integrated environmental control system for an aircraft compartment and aircraft power system, comprising:
   first and second air compressors, each air compressor adapted to receive and compress airflow from the aircraft exterior;
   an auxiliary power unit comprising:
      a first shaft,
      a power turbine rotatably mounted on the first shaft,
      a third air compressor rotatably mounted on the first shaft and adapted to receive and compress airflow from the aircraft exterior, and
      a first cooling turbine rotatably mounted on the first shaft and adapted to cool the airflow;
   first and second environmental control systems, each environmental control system comprising:
      a second shaft,
      a fourth compressor rotatably mounted on the second shaft for compressing the airflow,
      a second cooling turbine rotatably mounted on the second shaft for cooling the airflow,
      a heat exchanger circuit comprising a first heat exchanger adapted to receive the airflow from the first, second, and third air compressors, a second heat exchanger adapted to receive the airflow from the fourth compressor and to forward the airflow to the second cooling turbine, and a recirculation heat exchanger adapted to receive the airflow from the aircraft compartment, and
      a third heat exchanger adapted to receive the airflow from the first heat exchanger and to forward the airflow to the fourth compressor, and further adapted to receive and cool the airflow from the second cooling turbine using the airflow from the first heat exchanger.

8. The integrated environmental control system for an aircraft compartment and aircraft power system according to claim 7, wherein the auxiliary power unit further comprises an electrical generator and motor rotatably mounted on, and adapted to power rotation of, the first shaft.

9. The integrated environmental control system for an aircraft compartment and aircraft power system according to claim 7, wherein the auxiliary power unit is configured to provide airflow to the first heat exchanger using the third compressor.

10. The integrated environmental control system for an aircraft compartment and aircraft power system according to claim 9, wherein the auxiliary power unit is configured to provide airflow to the first heat exchanger using the third compressor at least while the aircraft is in flight, and to power the first and second air compressors using the power turbine at least while the aircraft is on ground.

11. The integrated environmental control system for an aircraft compartment and aircraft power system according to claim 7, wherein each environmental control system further comprises a fan rotatably mounted on the second shaft and adapted to drive ambient air for cooling the heat exchanger circuit.

12. The integrated environmental control system for an aircraft compartment and aircraft power system according to claim 7, wherein each environmental control system is configured to utilize power extracted from cooling the airflow using the cooling turbine to rotate the second shaft.

13. An integrated environmental control system for an aircraft compartment and aircraft power system, comprising:
   first and second air compressors, each air compressor adapted to receive and compress airflow from the aircraft exterior;
   an auxiliary power unit comprising:
      a first shaft,
      a power turbine rotatably mounted on the first shaft,
      a third air compressor rotatably mounted on the first shaft and adapted to receive and compress airflow from the aircraft exterior, and
      a first cooling turbine rotatably mounted on the first shaft and adapted to cool and forward the airflow to the aircraft compartment; and
   first and second environmental control systems, each environmental control system comprising:
      a first heat exchanger adapted to receive the airflow from the first, second, and third air compressors,
      a second shaft,
      a second cooling turbine rotatably mounted on the second shaft and adapted to receive and cool the airflow from the first heat exchanger, and further adapted to forward the airflow to the aircraft compartment,
      a fourth compressor rotatably mounted on the second shaft and adapted to receive and compress the airflow from the aircraft compartment, and
      a second heat exchanger adapted to receive the airflow from the fourth compressor, and further adapted to forward the airflow to the first cooling turbine.

14. The integrated environmental control system for an aircraft compartment and aircraft power system according to claim 13, wherein the auxiliary power unit further comprises an electrical generator and motor rotatably mounted on, and adapted to power rotation of, the first shaft.

15. The integrated environmental control system for an aircraft compartment and aircraft power system according to claim 13, wherein the auxiliary power unit is configured to provide airflow to the first heat exchanger using the third compressor.

16. The integrated environmental control system for an aircraft compartment and aircraft power system according to claim 15, wherein the auxiliary power unit is configured to provide airflow to the first heat exchanger using the third compressor at least while the aircraft is in flight, and to power the first and second air compressors using the power turbine at least while the aircraft is on ground.

17. The integrated environmental control system for an aircraft compartment and aircraft power system according to claim 13, wherein each environmental control system further comprises a fan rotatably mounted on the second shaft and adapted to drive ambient air for cooling the first and second heat exchangers.

18. The integrated environmental control system for an aircraft compartment and aircraft power system according to claim 13, wherein each environmental control system is configured to utilize power extracted from cooling the airflow using the cooling turbine to rotate the second shaft.

19. The integrated environmental control system for an aircraft compartment and aircraft power system according to claim 13, wherein the first cooling turbine is configured to cool the airflow to non-subfreezing temperatures.

20. The integrated environmental control system for an aircraft compartment and aircraft power system according to claim 13, wherein the second cooling turbine is configured to cool the airflow to non-subfreezing temperatures.

* * * * *

UNITED STATES PATENT AND TRADEMARK OFFICE
CERTIFICATE OF CORRECTION

| | | |
|---|---|---|
| PATENT NO. | : 7,607,318 B2 | Page 1 of 1 |
| APPLICATION NO. | : 11/440486 | |
| DATED | : October 27, 2009 | |
| INVENTOR(S) | : Lui et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 825 days.

Signed and Sealed this

Twelfth Day of October, 2010

David J. Kappos
*Director of the United States Patent and Trademark Office*